(12) United States Patent
Kast et al.

(10) Patent No.: US 7,860,828 B2
(45) Date of Patent: Dec. 28, 2010

(54) SYSTEM AND METHOD FOR TRANSFERING DATA FROM A SOURCE MACHINE TO A TARGET MACHINE

(75) Inventors: Robert Kast, Succasunna, NJ (US); Kenneth Galipeau, Towaco, NJ (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 11/985,519

(22) Filed: Nov. 14, 2007

(65) Prior Publication Data

US 2008/0082595 A1     Apr. 3, 2008

Related U.S. Application Data

(63) Continuation of application No. 10/611,312, filed on Jul. 1, 2003, now Pat. No. 7,318,071.

(60) Provisional application No. 60/473,849, filed on May 27, 2003.

(51) Int. Cl.
*G06F 7/00*     (2006.01)
*G06F 15/16*    (2006.01)

(52) U.S. Cl. .................. 707/610; 707/611; 707/612; 707/613; 707/614; 707/615; 707/616; 707/617; 707/618; 709/248

(58) Field of Classification Search ......... 707/200–204, 707/610–618; 709/248
See application file for complete search history.

(56) References Cited

U.S. PATENT DOCUMENTS

| 6,163,856 | A   |   | 12/2000 | Dion et al. |
| 6,178,427 | B1  |   | 1/2001  | Parker |
| 6,430,577 | B1  | * | 8/2002  | Hart ........................... 707/201 |
| 6,526,418 | B1  |   | 2/2003  | Midgley et al. |
| 6,615,223 | B1  | * | 9/2003  | Shih et al. .................... 707/201 |
| 2002/0049776 | A1 | * | 4/2002 | Aronoff et al. ............... 707/200 |
| 2002/0133507 | A1 | * | 9/2002 | Holenstein et al. .......... 707/200 |
| 2002/0133512 | A1 | * | 9/2002 | Milillo et al. ................ 707/204 |
| 2003/0074378 | A1 | * | 4/2003 | Midgley et al. ............. 707/204 |
| 2004/0030703 | A1 | * | 2/2004 | Bourbonnais et al. ....... 707/100 |

FOREIGN PATENT DOCUMENTS

WO     WO 96/42019     12/1996

* cited by examiner

*Primary Examiner*—Etienne P LeRoux
*Assistant Examiner*—Cindy Nguyen
(74) *Attorney, Agent, or Firm*—Van Pelt, Yi & James LLP

(57) ABSTRACT

Performing a synchronization operation is disclosed. A first processing thread is used to copy a first file from a first data storage to a second data storage using a first connection. A second processing thread is used to copy a second file from the first data storage to the second data storage using a second connection. The first file is copied substantially concurrently with the copying of the second file. The synchronization operation results in first copied file and a second copied file in the second data storage. A real-time replication operation is performed. The first copied file and the second copied file are updated in an order determined at least in part by an order in which changes were made to the first file and the second file, respectively, as stored in the first data storage.

17 Claims, 5 Drawing Sheets

SYSTEM AND METHOD FOR TRANSFERING DATA FROM A SOURCE MACHINE TO A TARGET MACHINE

CROSS REFERENCE TO RELATED APPLICATIONS

This application is a continuation of U.S. patent application Ser. No. 10/611,312, now U.S. Pat. No. 7,318,071, entitled A SYSTEM AND METHOD FOR TRANSFERRING DATA FROM A SOURCE MACHINE TO A TARGET MACHINE filed Jul. 1, 2003, which claims priority to U.S. Provisional Patent Application No. 60/473,849, entitled OVERLAPPED SYNCHRONIZATION IMPLEMENTATION IN REAL-TIME FILE-LEVEL REPLICATION filed May 27, 2003, both of which are incorporated herein by reference for all purposes.

FIELD OF THE INVENTION

The present invention relates generally to transferring data. More specifically, a system and method for processing and transferring data from a source machine to a target machine is disclosed.

BACKGROUND OF THE INVENTION

Real-time data replication typically includes two main operations. The first operation is to do a synchronization wherein a machine with data to be replicated, herein referred to as a source, has its data copied in bulk and transferred over to a second computer, herein referred to as a target. The second function can be a real-time replication of the changes to the data from the source to the target.

In performing data replication, it is typically a priority to reproduce the data and the changes to the data in the exact order that occurs in the source to avoid corruption of the data in the target. A problem with such data replication is its lack of efficiency. What is needed is a system and method for transferring data while still avoiding data corruption. The present invention addresses such a need.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
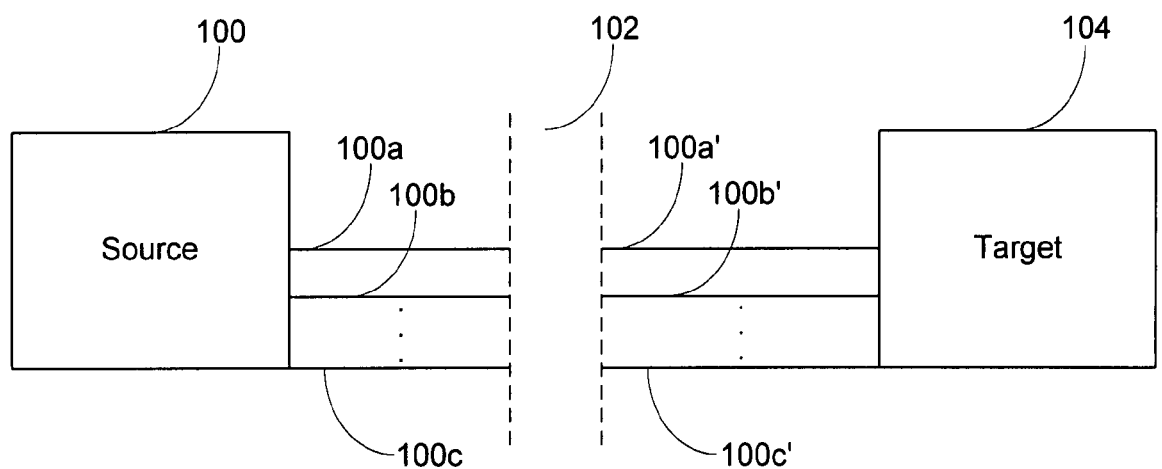
FIG. 1 is a block diagram of a data replication system according to an embodiment of the present invention.

FIG. 1 is a block diagram of a data replication system according to an embodiment of the present invention. In this example, a source machine 100 is coupled with a target machine 104. The source machine 100 and the target 104 are shown to be coupled by a plurality of connections 100A-100C, 100A'-100C' through a network 102, such as a LAN or WAN.

According to an embodiment of the present invention, the efficiency of the data transfer between the source 100 and the target 104 is increased by recognizing that producing the data and the data changes in the exact order in which it occurs at the source 100 is necessary during the real-time replication operation but not during the synchronization operation. Accordingly, the ordering continues to be important during the real-time replication operation, but not during the synchronization operation. Without the constraint of order, multiple connections 100A-100C can now be utilized.

According to an embodiment of the present invention, multiple threads can be used substantially concurrently to process and transfer information such as files. An example of the number of threads for each source 100 is 1-16. A single thread associated with the source 100 is herein referred to as the main site thread, while the other threads are herein referred to as sync threads.

Once the synchronization (sync) begins, at that point, real-time replication can also become active such that if someone changes data during the sync, then the real-time replication commands can be interleaved with the sync commands and queued along with the sync commands. For example, during the sync phase, as file A is being read to be transferred over to the target machine, file A is also being changed on the source machine. In this example, file A is preferably copied over to the target machine first prior to making any changes to file A on the target machine.

Because ordering for all non-sync commands is preferably preserved, the main site thread will preferably be the only thread to the target that will service all commands it encounters for that site. A sync thread, however, will only service commands associated with the sync function, such as SYNC_COPY commands.

During a sync operation if no real-time replication is also occurring, the kernel cache will generally be filled with SYNC_COPY commands. In this case, all site threads (main site thread as well as sync threads) will run down the queue, skipping all SYNC_COPY commands that have been or are being processed by other threads until it finds one that has not yet been processed. The thread will then perform whatever operation is requested for that command (full, incremental, compare attributes, etc.). If a sync thread encounters a non-sync command that has not yet been processed, it will go into a wait state until the main site thread has caught up with it and processed the non-sync command.

If the kernel cache is filled with non-sync commands, such as create, write, attribute, etc., the sync threads will not process these non-sync commands and are not allowed to run in front of the main site thread.

In one embodiment of the present invention, the rules governing the threads are as follows:

The main site thread can process all commands (sync and non-sync).

A sync thread can only process the SYNC_COPY command. However, preferably, the first or last SYNC_COPY command for a sync operation is not processed by the sync thread because it is considered a non-sync command (these denote the start and finish of a sync command and are not associated with any specific file transfer).

A sync thread can advance in the queue up until it encounters the first uncompleted non-sync command for this site. In general, the sync thread does not move ahead of the main thread unless the main thread is also working on a SYNC_COPY command.

The main site thread does not process a non-sync command unless all sync threads for that site have completed any sync commands they have been working on and are waiting on the main site thread to process the non-sync command.

These rules will allow files to be copied in roughly any order, but when a non-sync command is encountered, all site threads will synchronize to the same point before continuing. This behavior increases overhead of normal real-time replication. For this reason, the number of site threads is preferably increased only during sync operations and after the sync operation has finished it will preferably automatically revert to one thread (main site thread). For example, according to one embodiment of the present invention, when five seconds has passed without encountering a sync command, all threads except the main site thread closes.

Figure 2A:
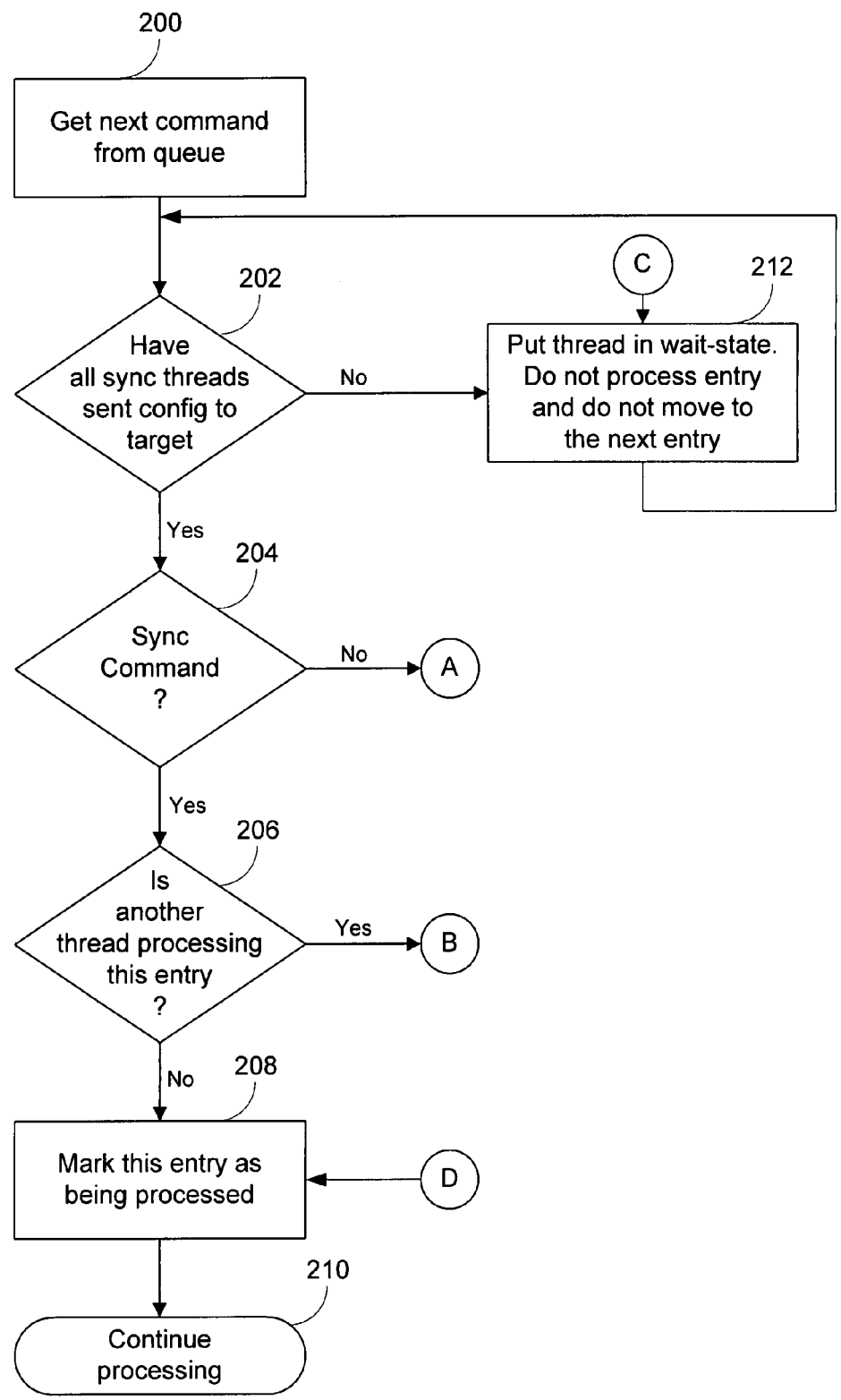
FIGS. 2A-2B are flow diagrams of a method according an embodiment of the present invention for transferring data.
Figure 2B:
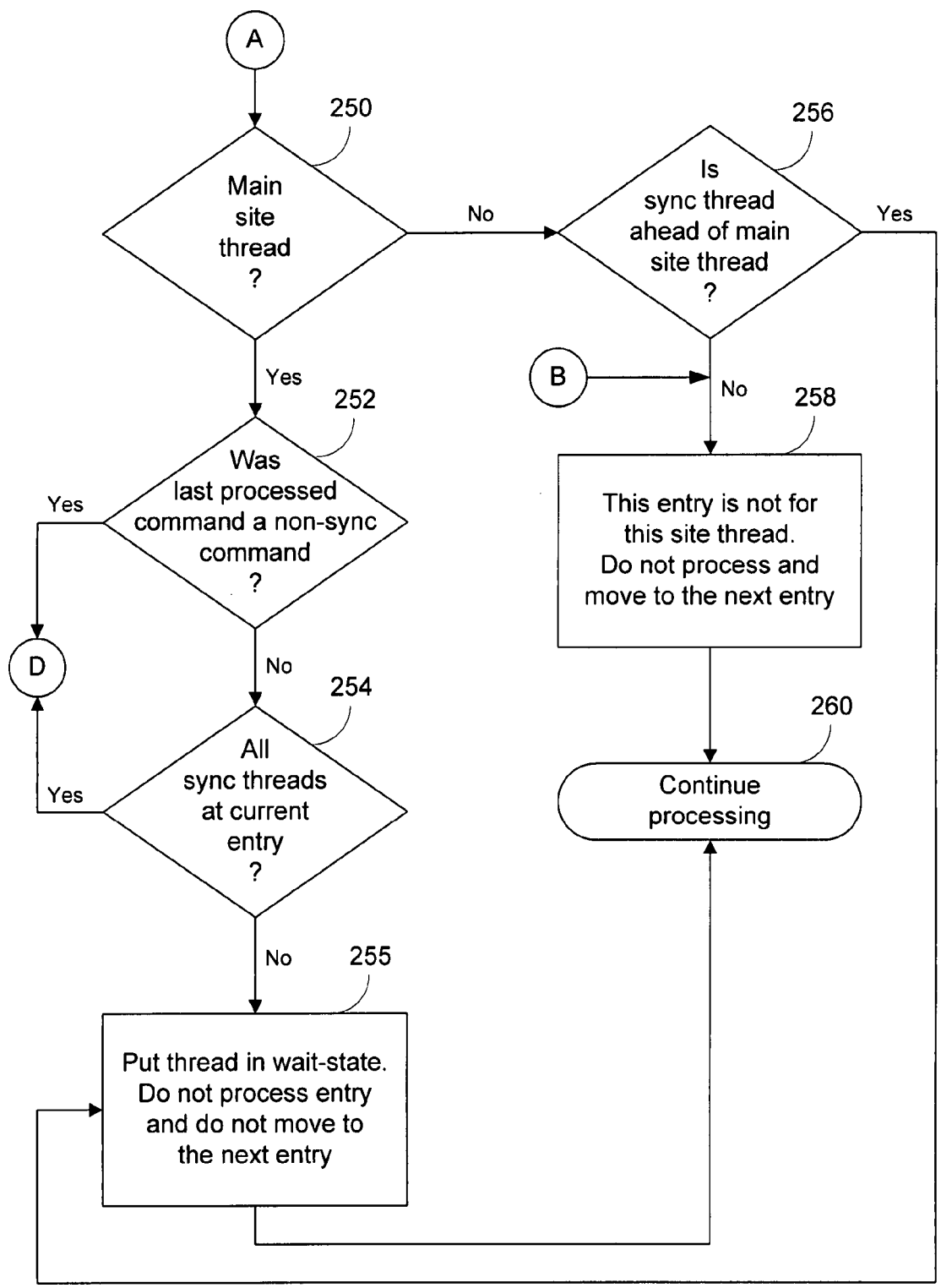

FIGS. 2A-2B are flow diagrams of a method according an embodiment of the present invention for transferring data. In this example, it is assumed that the sync operation has begun, multiple threads have been opened, and commands are waiting in the queue. The examples shown in FIGS. 2A-2B show a method performed by each of the multiple threads.

In this example, the thread retrieves the next command from the queue (200). It is determined whether all sync threads have sent configuration to the target machine (202). The configuration is sent through the thread to the target machine when the sync thread tries to connect to the target machine in order to inform the target machine what it is sending. If all sync threads have not yet sent the configurations to the target, then the thread goes into a wait state and does not process the queue entry and does not move to the next entry (212). Once all of the sync threads have sent their configurations to the target (202), then it is determined whether this particular queue entry is a sync command (204). If it is a sync command, then it is determined whether there is another thread processing this entry (206). If there is no other thread processing this entry, then the entry is marked as now being processed (208). The thread then continues to process the entry (210). For example, the file associated with the entry is transferred from the source machine to the target machine.

If the queue entry is not a sync command (204 of FIG. 2A), then if this thread is a main site thread (250), then it is determined whether the last processed command was a non-sync command (252). If the last command was not a non-sync command, then it is determined whether all sync threads are at the current entry (254).

If all the sync threads are not at the current entry (254), then the thread goes into a wait state. The entry is not processed and the thread does not move to the next entry (255). Once all the sync threads are at the current entry, then the entry is marked as being processed (208 of FIG. 2A), and processing is continued (210). The entry is also marked as being processed (208 of FIG. 2A) if the last processed command was a non-sync command (252 of FIG. 2B) and the thread is a main site thread (250).

If the thread is not a main site thread (250), then it is determined whether a sync thread is ahead of the main site thread (256). If the sync thread is ahead of the main site thread, then the thread is put in a wait state, and the entry is not processed and the thread does not move to the next entry (255). If, however, the sync thread is ahead of the main site thread (256), then this entry is not for this site thread and it is not processed. The thread moves to the next entry (258). Thereafter, processing continues (260).

Figure 3:
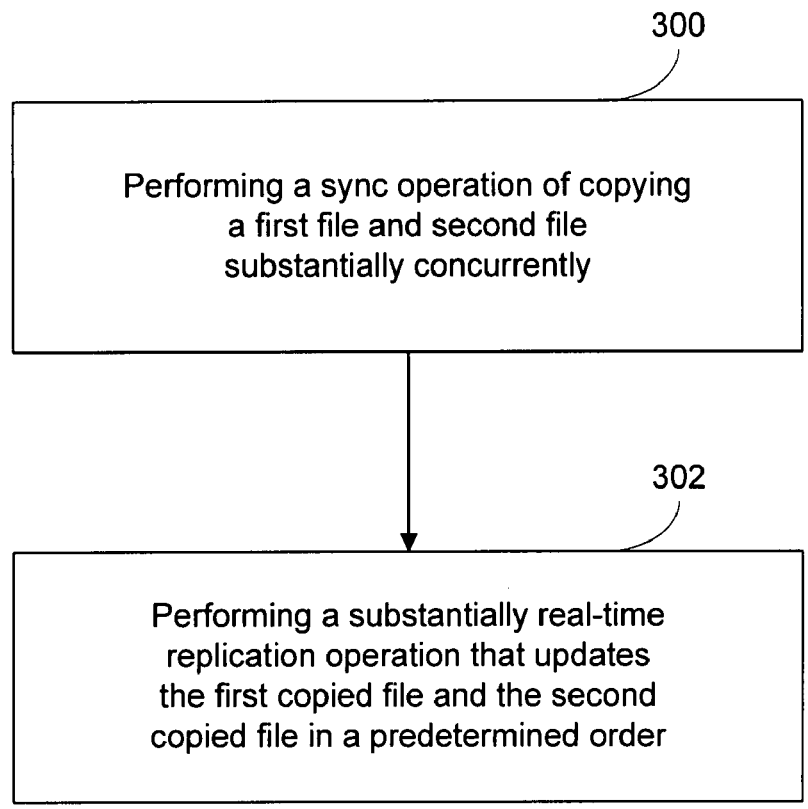
FIG. 3 is another flow diagram of a method according to an embodiment of the present invention for transferring data.

FIG. 3 is another flow diagram of a method according to an embodiment of the present invention for transferring data. In this example, a sync operation is performed wherein a first file and a second file are copied substantially concurrently from the source machine to the target machine (300). Additionally, a substantially real-time replication operation is performed such that the first copied file and the second copied file are updated in a predetermined order.

Figure 4:
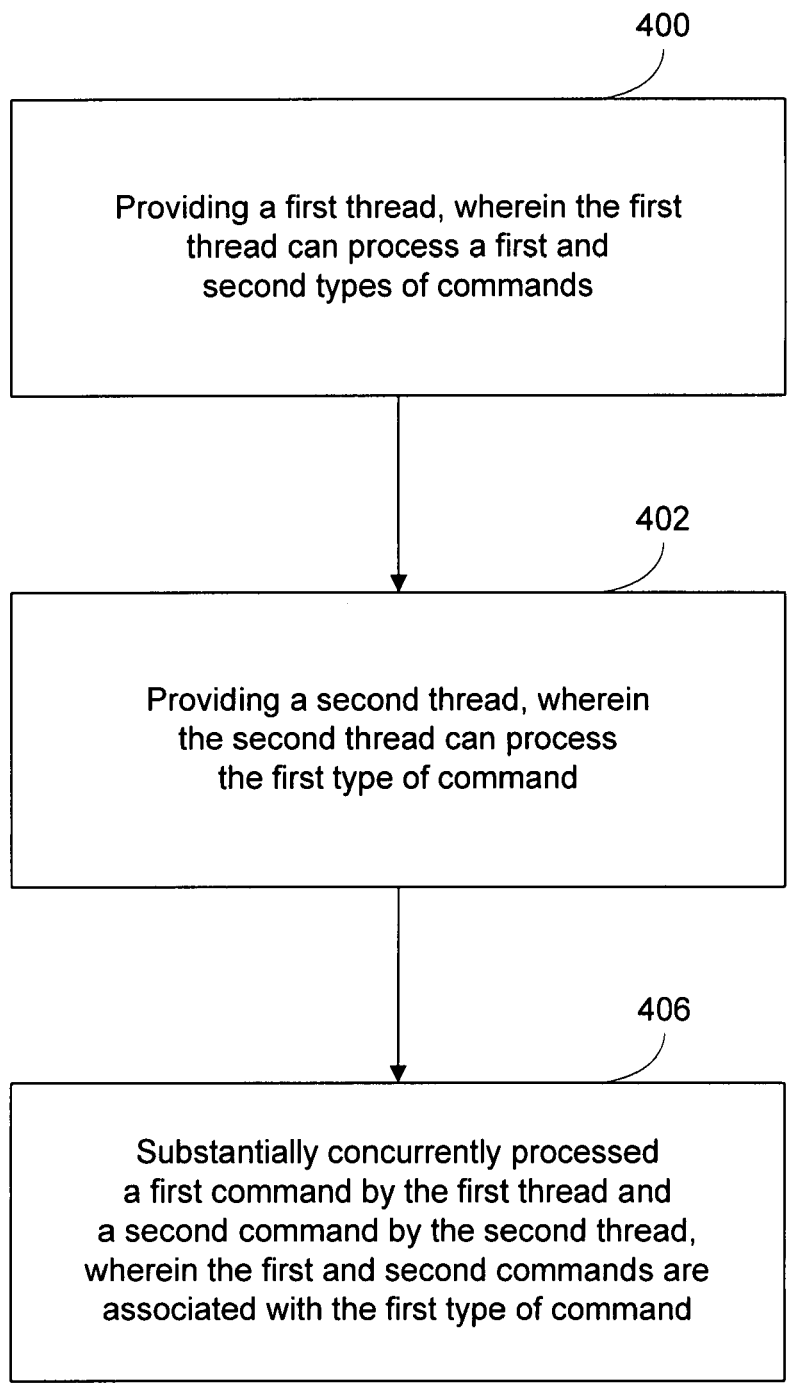
FIG. 4 is yet another flow diagram of a method according to an embodiment of the present invention for transferring data.

FIG. 4 is yet another flow diagram of a method according to an embodiment of the present invention for transferring data. In this example, a first thread is provided, wherein the first thread can process first and second types of commands (400). A second thread is also provided, wherein the second thread can process the first type of command (402). A first command is processed by the first thread substantially concurrently with a second command being processed by the second thread, wherein the first and second commands are associated with the first type of command (406).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for transferring data comprising:
performing a synchronization operation wherein the synchronization operation uses a first processing thread to copy a first file from a first data storage to a second data storage using a first processing, and a second processing thread to copy a second file from the first data storage to the second data storage using a second connection, wherein the first file is copied substantially concurrently with the copying of the second file, wherein the first file and the second file are copied regardless of order, and wherein the synchronization operation results in a first copied file and a second copied file in the second data storage; and
performing a real-time replication operation wherein the real-time replication operation updates the second data storage with changes made to the first copied file and the Second copied file as stored in the first data storage in an order determined at least in part by an order in which changes were made to the first file and the second file, respectively, as stored in the first data storage;

wherein the real-time replication operation and the synchronization operation Overlap in time;
wherein copying is in response to one or more synchronization commands and updating is in response to one or more real-time replication commands, and wherein the real-time replication commands are interleaved with synchronization commands and are placed in a queue along with the synchronization commands.

2. The method of claim 1, wherein a first command associated with the synchronization operation can be processed by a first thread or a second thread, and a second command associated with the real-time replication operation can be processed by the second thread.

3. The method of claim 1, further including processing commands of the real-time replication operation using a single thread.

4. The method of claim 3, wherein the single thread is the only thread configured to process commands of real-time replications.

5. The method of claim 4, wherein the single thread is configured to process commands of both real-time replication operations and synchronization operations.

6. The method of claim 5, wherein at least one of the first thread and the second thread is a synchronization thread configured to process only commands of synchronization operations.

7. A system for transferring data comprising:
a processor; and
a first data storage coupled to the processor, wherein the first data storage is associated with a first file and a second file;
wherein the processor is configured to perform a synchronization operation wherein the synchronization operation uses a first processing thread to copy the first file from the first data storage to a second data storage using a first connection, and a second processing thread to copy a second file from the first data storage to the second data storage Using a second connection, wherein the first file is copied substantially concurrently with the copying of the second file, wherein the first file and the second file are copied regardless of order, and wherein the synchronization operation results in a first copied file in the second data storage and a second copied file in the second data storage; and also configured to perform a real-time replication operation wherein the real-time replication operation updates the second data storage with changes made to the first copied file and the second copied file as stored in the first data storage in an order determined at least in part by an order in which changes were made to the first file and the second file, respectively, as stored in the first data storage;
wherein the real-time replication operation and the synchronization operation overlap in time;
wherein copying is in response to one or more synchronization commands and updating is in response to one or more real-time replication commands, and wherein the real-time replication commands are interleaved with synchronization commands and are placed in a queue along with the synchronization commands.

8. The system of claim 7, wherein a first command associated with the synchronization operation can be processed by a first thread or a second thread, and a second command associated with the real-time replication operation can be processed by the second thread.

9. The system of claim 7, wherein the processor is further configured to process commands of the real-time replication operations using a single thread.

10. The system of claim 9, wherein the single thread is the only thread configured to process commands of real-time replications.

11. The system of claim 10, wherein the single thread is configured to process commands of both real-time replication operations and synchronization operations.

12. The system of claim 11, wherein at least one of the first thread and the second thread is a synchronization thread configured to process only commands of synchronization operations.

13. A computer program product for transferring data, the computer program product being embodied in a non-transitory computer readable medium and comprising computer instructions for:
performing a synchronization operation wherein the synchronization operation uses a first processing thread to copy a first file from a first data storage to a second data storage using a first connection, and a second processing thread to copy a second file from the first data storage to the second data storage using a second connection, wherein the first file is copied substantially concurrently with tile copying of the second file, wherein the first file and the second file are copied regardless of order, and wherein the synchronization operation results in a first copied file and a second copied file in the second data storage; and
performing a real-time replication operation wherein the real-time replication operation updates the second data storage with changes made to the first copied file and the second copied file as stored in the first data storage in an order determined at least in part by an order in which changes were made to the first file and the second file, respectively, as stored in the first data storage;
wherein the real-time replication operation and the synchronization operation overlap in time;
wherein copying is in response to one or more synchronization commands and updating is in response to one or more real-time replication commands; and wherein the real-time replication commands are interleaved with synchronization commands and are placed in a queue along with the synchronization commands.

14. The computer program product of claim 13, wherein a first command associated with the synchronization operation can be processed by a first thread or a second thread, and a second command associated with the real-time replication operation can be processed by the second thread.

15. The computer program product of claim 13, further comprising computer instructions for processing commands of the real-time replication operation using a single thread.

16. The computer program product of claim 15, wherein the single thread is the only thread configured to process commands of real-time replication operation, and wherein the single thread is configured to process commands of both real-time replication operations and synchronization operations.

17. The computer program product of claim 16, wherein at least one of the first thread and the second thread is a synchronization thread configured to process only commands of synchronization operations.

* * * * *